US009353920B2

(12) United States Patent
Callanan (10) Patent No.: US 9,353,920 B2
(45) Date of Patent: May 31, 2016

(54) SOLAR JAR LID (71) Applicant: Brian Joseph Callanan, Buffalo, NY (US)

(72) Inventor: Brian Joseph Callanan, Buffalo, NY (US)

(*) Notice: Subject to any disclaimer, the term of this patent is extended or adjusted under 35 U.S.C. 154(b) by 165 days.

(21) Appl. No.: 14/019,672

(22) Filed: Sep. 6, 2013

(65) Prior Publication Data
US 2014/0071663 A1    Mar. 13, 2014

Related U.S. Application Data (63) Continuation-in-part of application No. 12/464,824, filed on May 12, 2009, now abandoned.

(51) Int. Cl.
| *F21L 4/08* | (2006.01) |
| *F21S 9/03* | (2006.01) |
| *F21V 15/01* | (2006.01) |
| *F21V 33/00* | (2006.01) |
| *F21V 21/08* | (2006.01) |
| *F21W 131/10* | (2006.01) |
| *F21Y 101/02* | (2006.01) |

(52) U.S. Cl.
CPC . *F21L 4/08* (2013.01); *F21S 9/037* (2013.01); *F21V 15/01* (2013.01); *F21V 21/08* (2013.01); *F21V 33/0024* (2013.01); *F21W 2131/10* (2013.01); *F21Y 2101/02* (2013.01)

(58) Field of Classification Search
CPC .......... B65D 51/248; B67B 7/14; B67B 7/15; F21L 4/08; F21S 9/03; F21S 9/037; F21V 15/01; F21V 21/08; F21V 33/0024; F21W 2131/10; F21Y 2101/02
USPC ................ 362/101, 154, 183, 362; D7/392.1
See application file for complete search history.

(56) References Cited

U.S. PATENT DOCUMENTS

| 5,178,450 | A | * | 1/1993 | Zelensky et al. ............... 362/154 |
| 6,086,216 | A | | 7/2000 | Goldfarb |
| 7,168,392 | B2 | | 1/2007 | Kuelbs |
| 7,744,253 | B2 | * | 6/2010 | Engel ........................... 362/297 |
| 7,926,966 | B2 | | 4/2011 | Winters |
| 2006/0279956 | A1 | | 12/2006 | Richmond |
| 2007/0221133 | A1 | | 9/2007 | Richmond |

* cited by examiner

Primary Examiner — Stephen F Husar
(74) Attorney, Agent, or Firm — Del Vecchio and Stadler LLP (57) ABSTRACT A lighting assembly 20 comprising a lighting housing 22 having a rectangular box-shaped portion 24 and having a circular point of attachment 5 having a circular shaped housing wall 50 from which extend tabs. A threaded container 100 having an externally threaded portion 106 that is capable of engaging the tabs extending from the circular shaped housing wall. The rectangular box-shaped portion 24 defines a housing recess 44 for housing a solar panel 120 and a battery 122 and the battery 122, and the battery is for powering light emitting diodes 124.

12 Claims, 15 Drawing Sheets

Fig. 1

Fig. 2: Side view

Fig. 3

Fig. 4: View from top

Fig. 5: Diagonal view without handle

Fig. 6: Side view without handle

Fig. 7: Diagonal view without solar panel insert or tabs for handle

SOLAR JAR LID

CROSS-REFERENCE TO RELATED APPLICATION

This application is a continuation-in-part of pending U.S. Non-provisional application Ser. No. 12/464,824, filed May 12, 2009, now abandoned, the entire content and disclosure of which is hereby incorporated herein by reference.

FIELD OF INVENTION

This invention is directed to a solar jar lid.

BACKGROUND OF THE INVENTION

It is often desirable to provide additional outdoor or indoor lighting without adding expense to one's electric bill.

SUMMARY OF THE INVENTION

Accordingly, it is the subject of this invention to provide a solar jar lid that is charged outdoors and is capable of providing outdoor lighting or indoor lighting. In one preferred embodiment the solar jar lid includes a hook for supporting a handle and the handle for supporting a solar panel insert by way of tabs. The tabs connect to a rectangular plastic encasement that houses a solar panel, battery and light emitting diodes (hereinafter referred to as LEDs), and a removable top is supported on the on the rectangular plastic encasement. A circular point of attachment is joined to the rectangular plastic encasement and tabs extend from the circular point of attachment for engaging a jar.

In another preferred embodiment a lighting assembly is provided and comprises a lighting housing having a rectangular box-shaped portion with a circular point of attachment. The circular point of attachment has a circular shaped housing wall from which extend tabs, and the tabs are flush with the circular shaped housing wall. The lighting assembly further includes threaded container having an externally threaded portion that is capable of engaging the tabs extending from the circular shaped housing wall. The rectangular box-shaped portion defines a housing recess for housing a solar panel and a battery and the battery, and the battery is for powering light emitting diodes.

DETAILED DESCRIPTION

The solar jar lid comprises a solar panel, a battery and at least one light emitting diode (LED), wherein the solar panel, battery, and at least one LED are encased in rectangular plastic. In one embodiment, the rectangular plastic encasement has a separate point of attachment that is molded to fit the dimensions of a glass or plastic jar top. As such, the solar jar lid can be screwed onto a glass jar or plastic jar. Another advantage is that the solar jar lid can be transferred from one glass jar or plastic jar to another of similar dimensions to which the solar jar lid was made to fit. Additionally, the point of attachment of the rectangular plastic encasement can be molded to fit glass jars or plastic jars of different dimensions. The solar jar lid can be charged outdoors and used outdoors or can be brought indoors for providing light. It is envisioned that the solar jar lid can be hung from a manmade object, an object that occurs in nature, such as a tree), or can be placed either indoors or outdoors on a flat surface.

In a preferred embodiment, the solar jar lid is attached to a glass jar or plastic jar and is hung from a metal stake which is placed in the ground. In this embodiment, the solar lid jar is hung from the metal stake for the purposes of being charged and, once charged, providing light. In another embodiment, the solar jar lid is attached to a glass jar or plastic jar and is hung from a structure such as an awning. Again, the solar jar lid is hung from the awning for the purpose of being charged and, once charged, providing light.

In still another embodiment, the solar jar lid is attached to a glass jar or plastic jar and is hung from a tree or bush. The solar jar lid is strategically placed in the tree or bush so as to allow it to be charged and, once charge, provide light.

The point of attachment of solar jar lid can be molded to fit different size glass jars or plastic jars.

The solar jar lid comprises a rectangular plastic encasement having a handle and hook, wherein a solar panel, battery and at least one LED are encased in the plastic encasement.

In one embodiment, the rectangular plastic encasement has a point of attachment that is molded in such a way as to allow it to be attached by screwing it onto a glass jar or plastic jar. The solar jar lid can be transferred from one glass jar or plastic jar to another of the same dimension. Alternatively, the point of attachment of the rectangular plastic encasement can be molded to fit different size glass jars or plastic jars.

Figure 1:
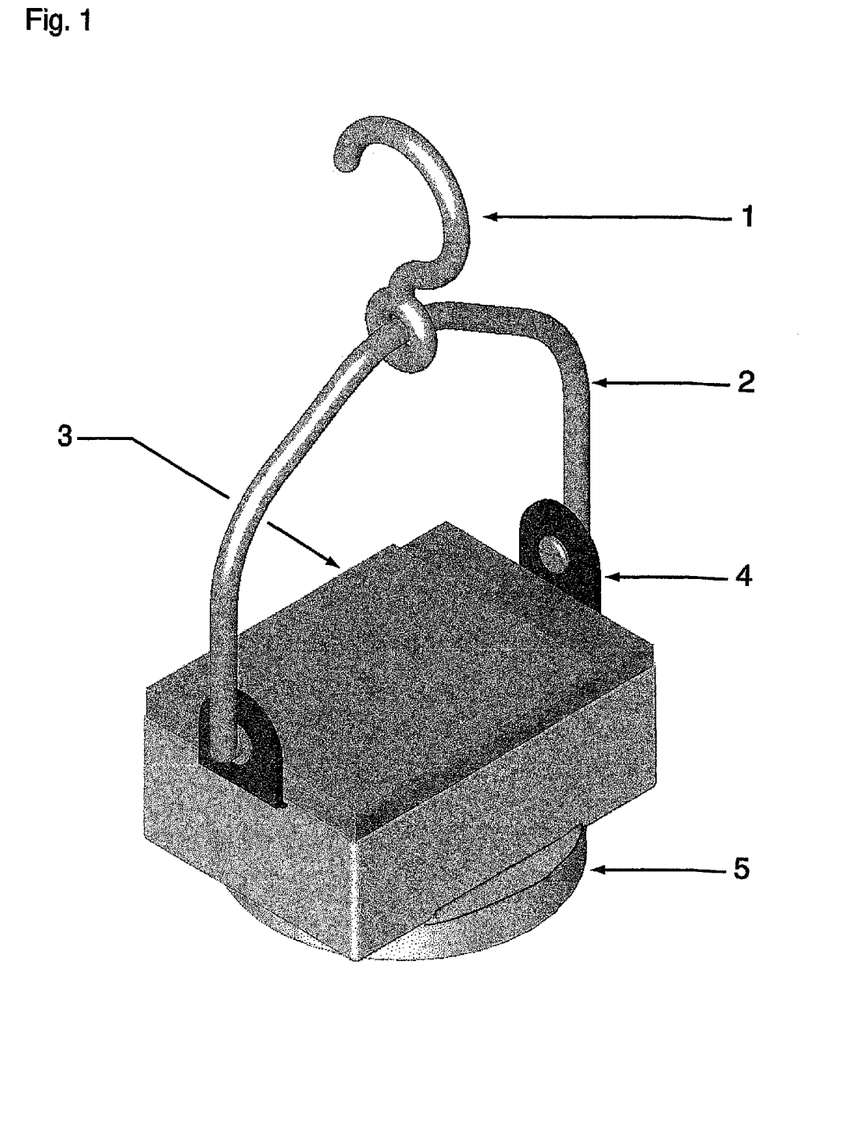
FIG. 1 depicts the solar jar lid.
Figure 2:
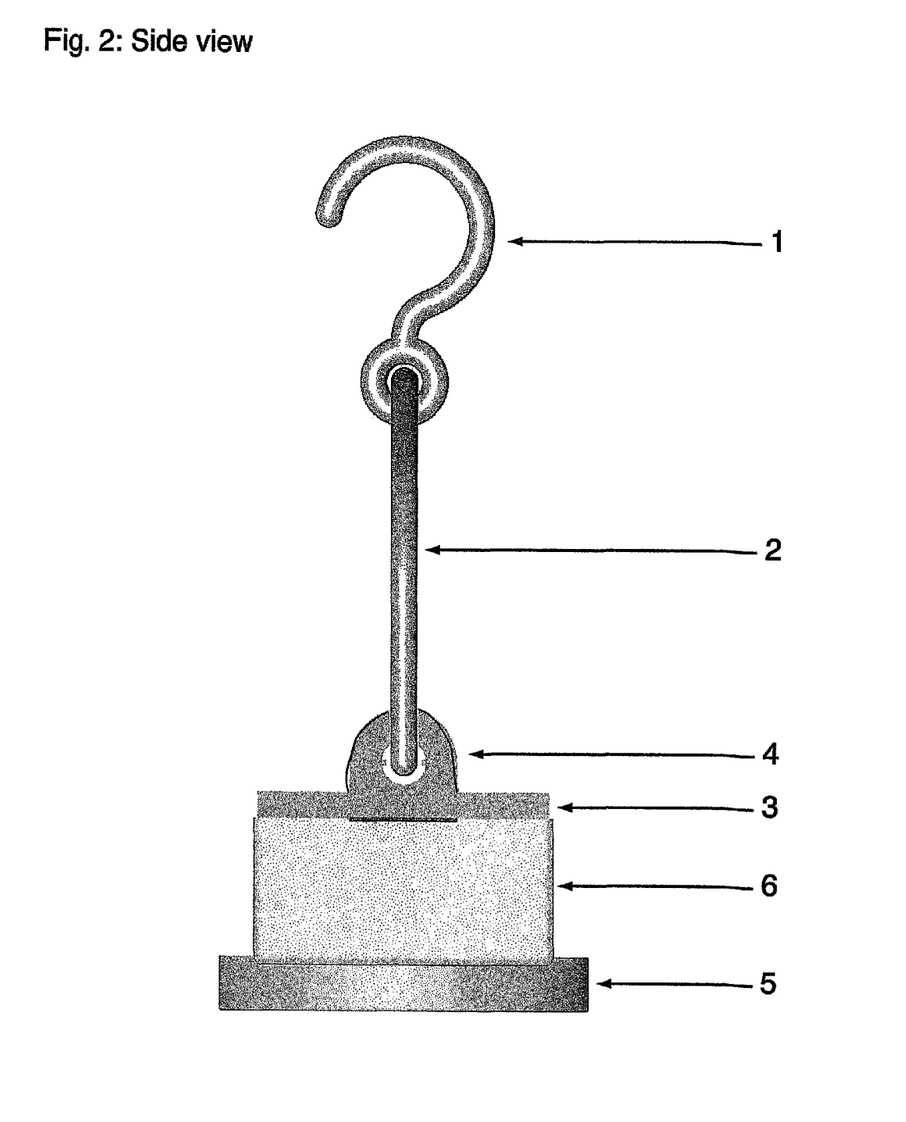
FIG. 2 depicts a side view of the solar jar lid.
Figure 3:
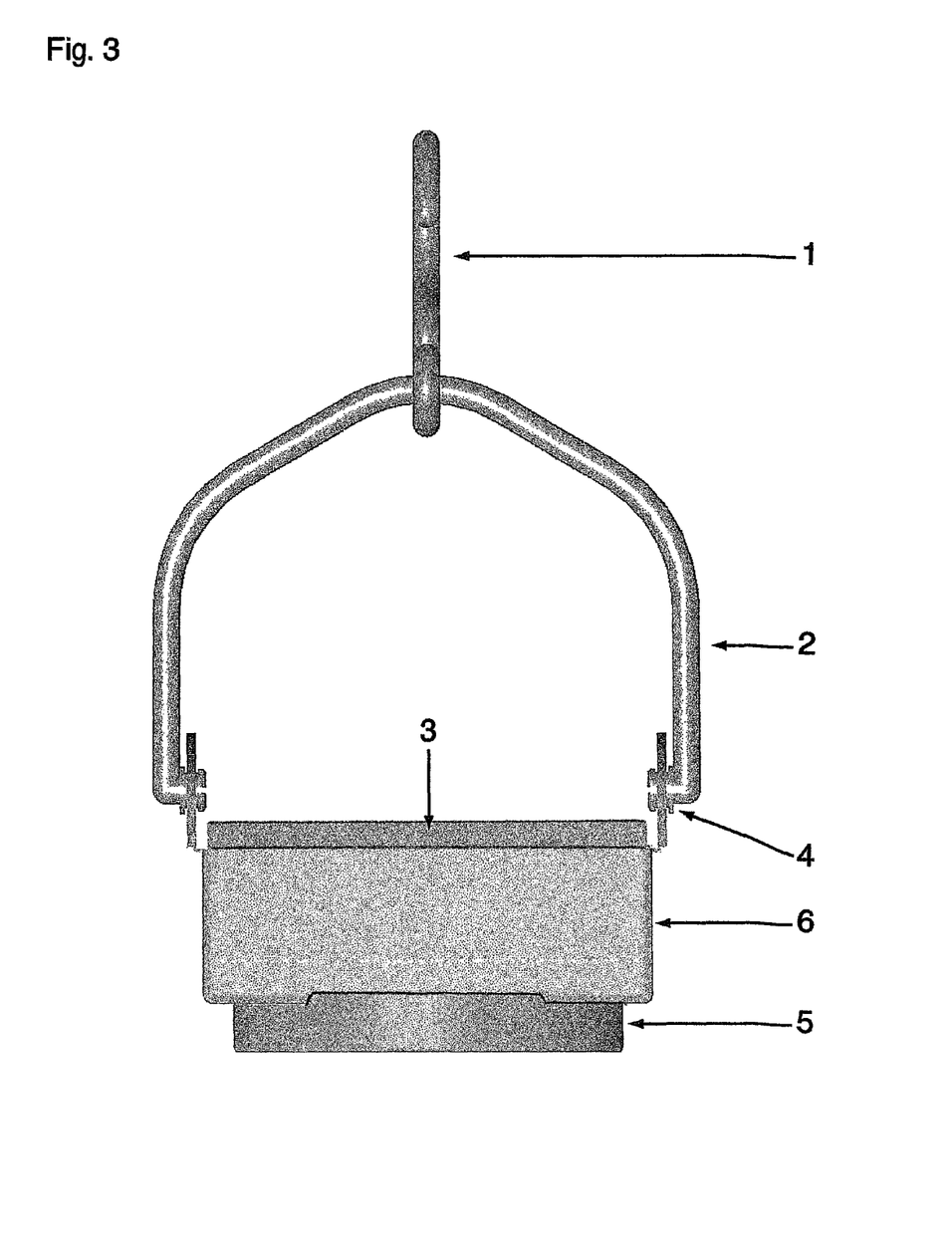
FIG. 3 depicts another side view of the solar jar lid.

Turning now to FIGS. 1-6, the numerals depicted in the figures represent the following components:

FIG. 1 and FIG. 2 and FIG. 3
1. Hook
2. Handle
3. Top of rectangular plastic encasement 6 containing solar panel, battery and LEDs, wherein top is removable and placed onto rectangular plastic encasement 6 in a downward direction (see FIG. 3)
4. Tabs to attach handle to solar jar lid shown in upright position
5. Circular point of attachment of solar jar lid to glass jar or plastic jar (not shown in figure)

FIG. 2 and FIG. 3
6. Rectangular plastic encasement containing solar panel, battery and at least one LED FIG. 4
4. Tabs to attach handle to solar jar lid shown in a down position 7. Tabs to hold LEDs in place within rectangular plastic encasement 6
8. Openings for LEDs to be inserted into rectangular plastic encasement 6
9. Tabs within circular point of attachment 5 to attach solar jar lid onto glass jar or plastic jar (not shown in FIG.
10. Rectangular opening of rectangular plastic encasement 6 to fit solar panel, battery and LEDs
11. Rounded shape of circular point of attachment 5 to fit onto glass jar or plastic jar (not shown in figure)

Figure 5:
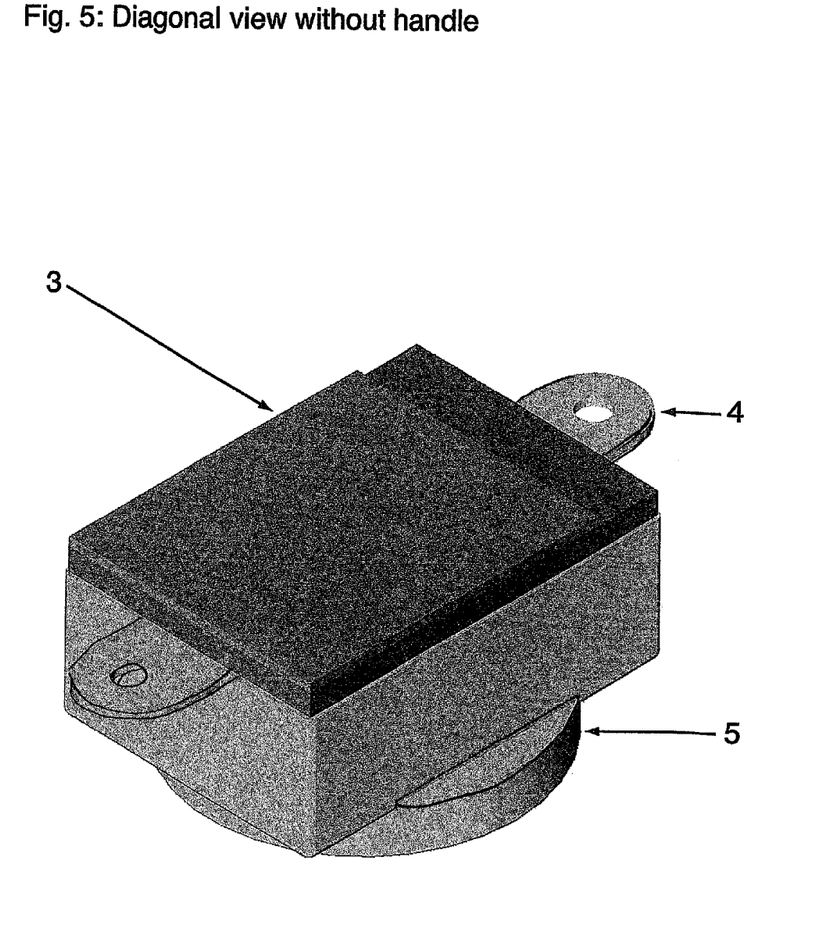
FIG. 5 depicts a diagonal view of the solar jar lid without the handle.
Figure 6:
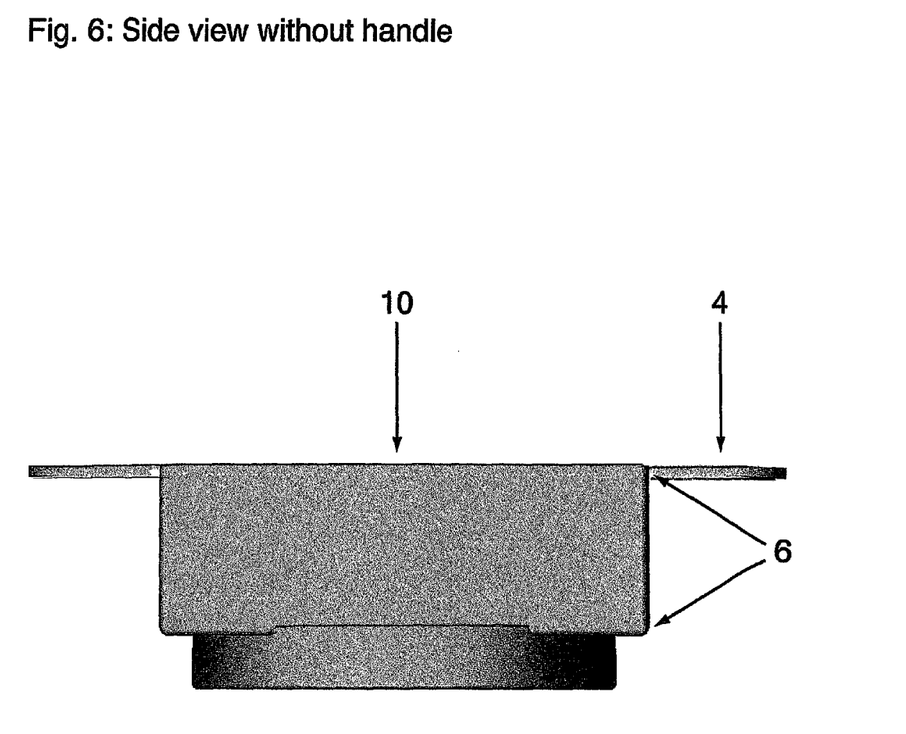
FIG. 6 depicts a side view of the solar jar lid without the handle.
Figure 7:
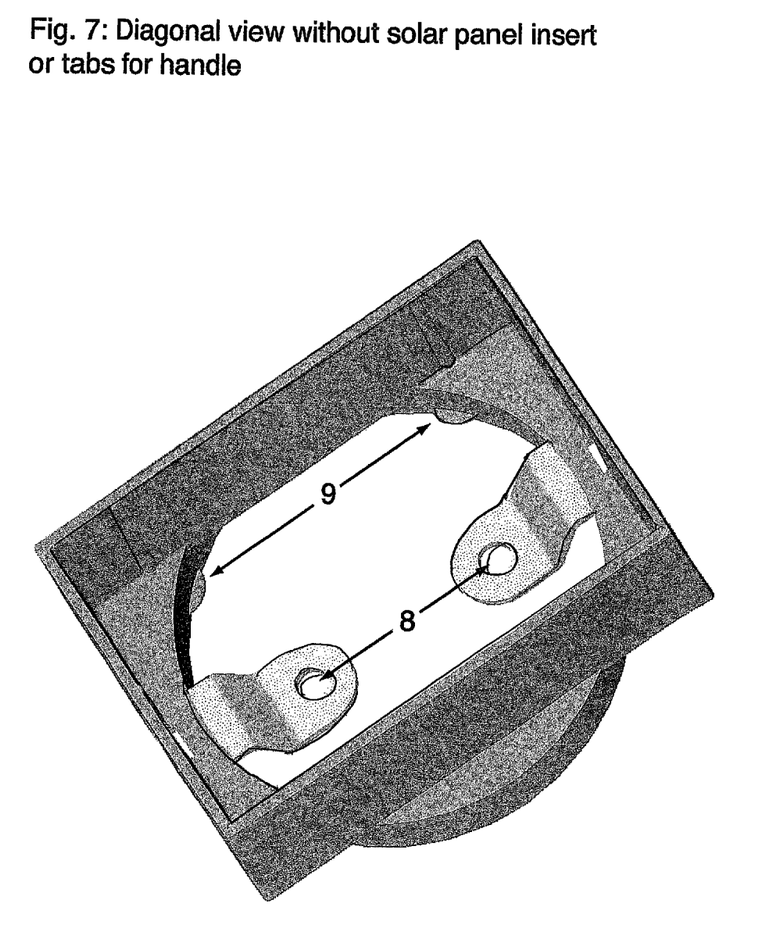
FIG. 7 depicts a diagonal view of the solar jar lid without the solar panel insert or tabs for the handle.

FIG. 5
3. Top of rectangular plastic encasement 6 containing solar panel, battery and LEDs
4. Tabs to attach handle to solar jar lid shown in a down position
5. Circular point of attachment to glass jar or plastic jar (not shown in figure), wherein the height of this component is molded to match the height of the top portion of said glass jar or plastic jar FIG. 6
4. Tabs to attach handle to solar jar lid (side view) shown in a down position
6. Rectangular plastic encasement containing solar panel, battery and at least one LED
10. Rectangular opening of rectangular plastic encasement 6 to fit solar panel, battery and LED, wherein the arrow depicts the direction of insertion of solar panel, battery and LED FIG. 7
8. Openings for LEDs to be inserted into rectangular plastic encasement 6
9. Tabs to attach solar jar lid onto glass jar or plastic jar (not shown in figure)

As can be seen in FIGS. 1-6, the solar jar lid is comprised of a hook 1 to allow the solar jar lid to be hung from a manmade object, such as a metal stake, or an object that occurs in nature, such as a tree branch or a bush. The solar jar lid also has a handle 2, a rectangular plastic encasement 6 having a top 3, and tabs 4 for attaching the solar jar lid to the handle 2. The solar jar lid further includes a circular point of attachment 5 to attach the solar jar lid to a glass jar or plastic jar. The circular point of attachment 5 is sized such that the height thereof is substantially the same as that of a top portion of the glass jar or plastic jar.

Figure 4:
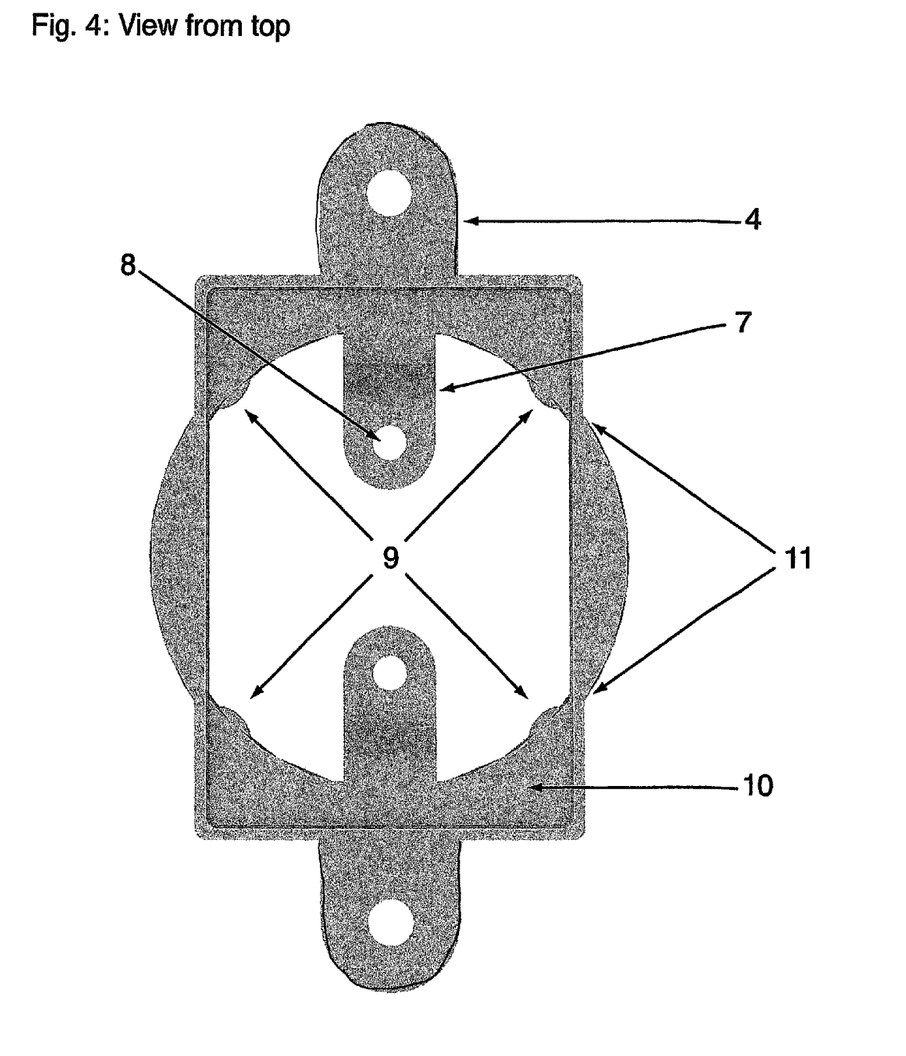
FIG. 4 depicts a top view of the solar jar lid.

As shown in FIG. 4, within the rectangular plastic encasement 6, the solar jar lid further comprises tabs 7 which serve to hold LEDs in place within rectangular plastic encasement 6. At the end of the tabs 7, there are openings 8 for LEDs to be inserted into rectangular plastic encasement 6. Rectangular opening 10 of rectangular plastic encasement 6 allows the solar jar lid to fit solar panel, battery and at least one LED.

Within the circular point of attachment 5, there are tabs 9 to securely attach solar jar lid onto the glass jar or plastic jar. Finally, rounded shape 11 of circular point of attachment 5 allows the solar jar lid to be releasably attached to glass jars or plastic jars.

In another preferred embodiment shown in FIGS. 8-13 there is a lighting assembly 20 that includes a threaded container 100 and a lighting housing 22. As shown, the lighting housing 22 does not include the previously described tabs 4 and tabs 7.

Figure 8:
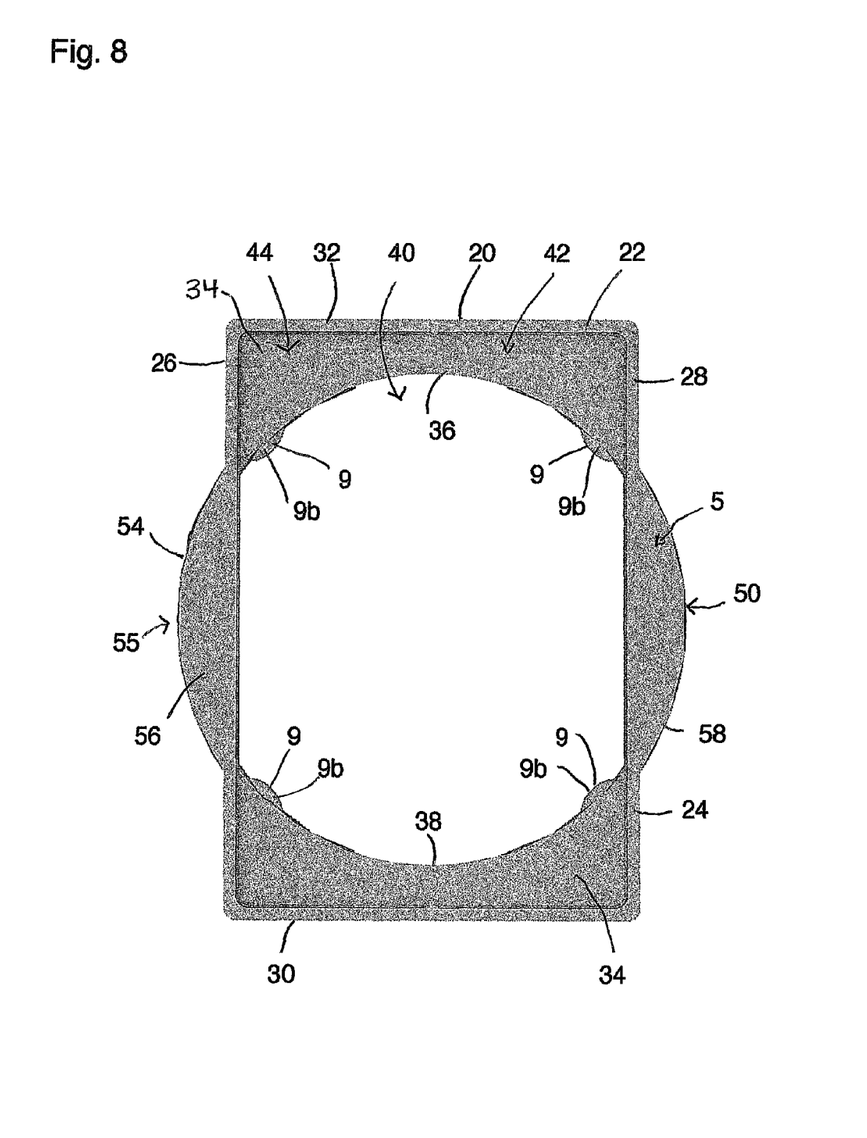
FIG. 8 is a top view of another preferred embodiment showing a lighting housing.
Figure 9:
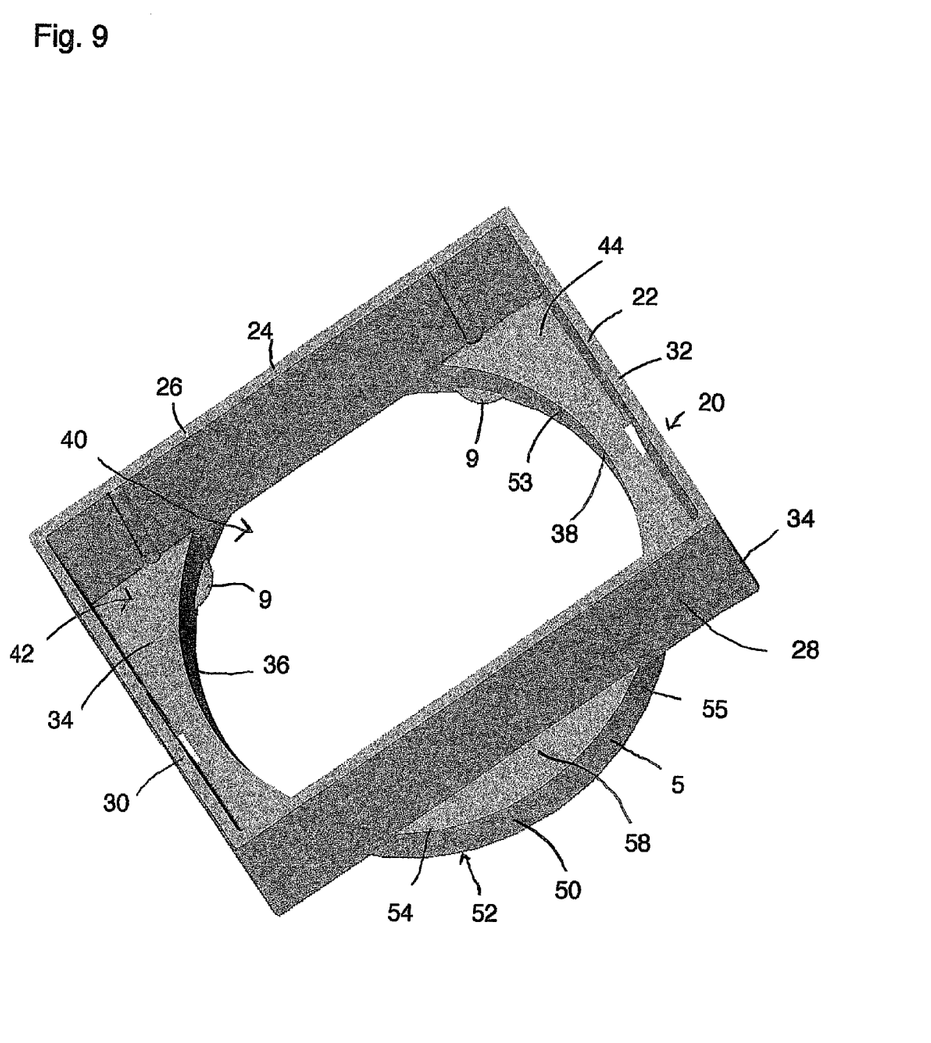
FIG. 9 is a rear perspective view of the lighting housing.
Figure 10:
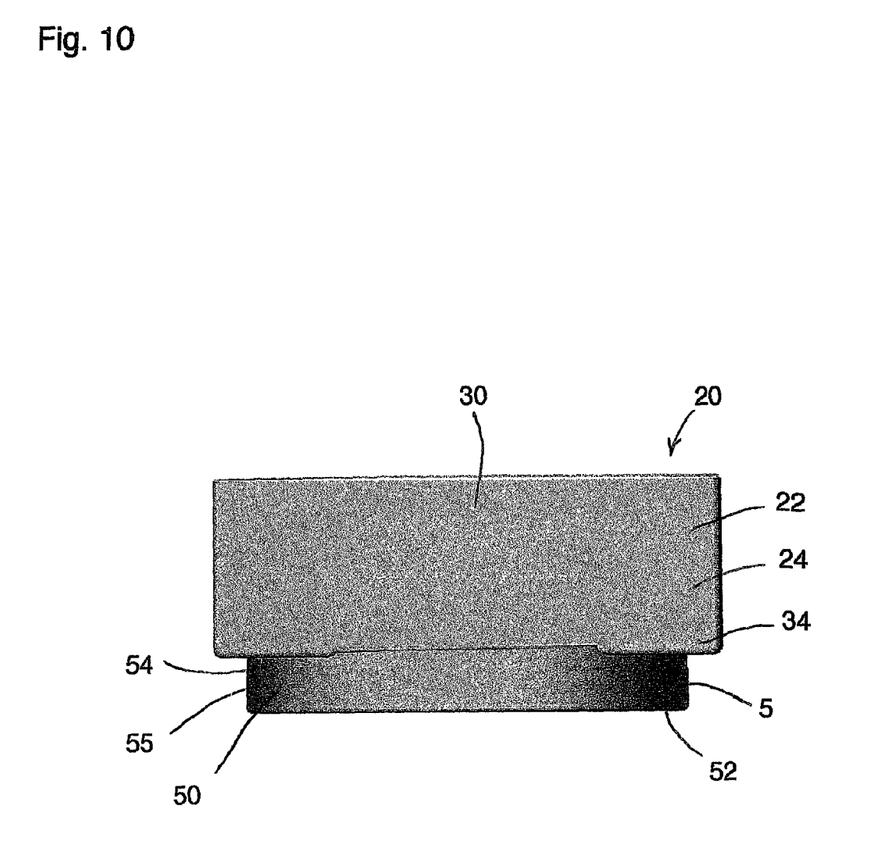
FIG. 10 is a side view of the lighting housing.

As best shown in FIGS. 8-10, the lighting housing 22 has a rectangular box-shaped portion 24 having opposed first and second housing walls 26, 28 and opposed third and forth housing walls 30, 32, all of which extend from a base wall 34. The base wall 34 has opposed first and second convex surfaces 36, 38, and each of these surfaces extends from the first housing wall 26 to the second housing wall. Together the first and second convex surfaces 36, 38 and first and second housing walls 26, 28 define a base wall opening 40. A rectangular shaped opening 42 is defined by the opposed first and second housing walls 26, 28 and opposed third and forth housing walls 30, 32, and the rectangular shaped opening 42 leads to a housing recess 44 and the housing recess 44 leads to the base wall opening 40.

The lighting housing 22 also includes above-mentioned circular point of attachment 5. The circular point of attachment 5 includes a circular shaped housing wall 50 having opposed first and second circular shaped housing edges 52, 54. The circular shaped housing wall 50 has opposed interior and exterior circular shaped housing wall surfaces 53, 55. The second circular shaped housing edge 54 meets with and merges with the base wall 34 of the rectangular shaped portion 24. In addition, second circular shaped housing edge 54 meets with and merges with the opposed first and second housing walls 26, 28. A first container stop wall 56 extends from the second circular shaped housing edge 54 to the first housing wall 26. A second container stop wall 58 extends from the second circular shaped housing edge 54 to the second housing wall 28. The first and second container stop walls 56, 58 are for limiting the degree to which the treaded container 100 can be introduced into the circular shaped housing wall 50. In addition, in one of the preferred embodiments the rectangular box-shaped portion 24 and the circular point of attachment 5 are formed as a one-piece body 34, for example they are molded as a one-piece body 34.

Figure 11:
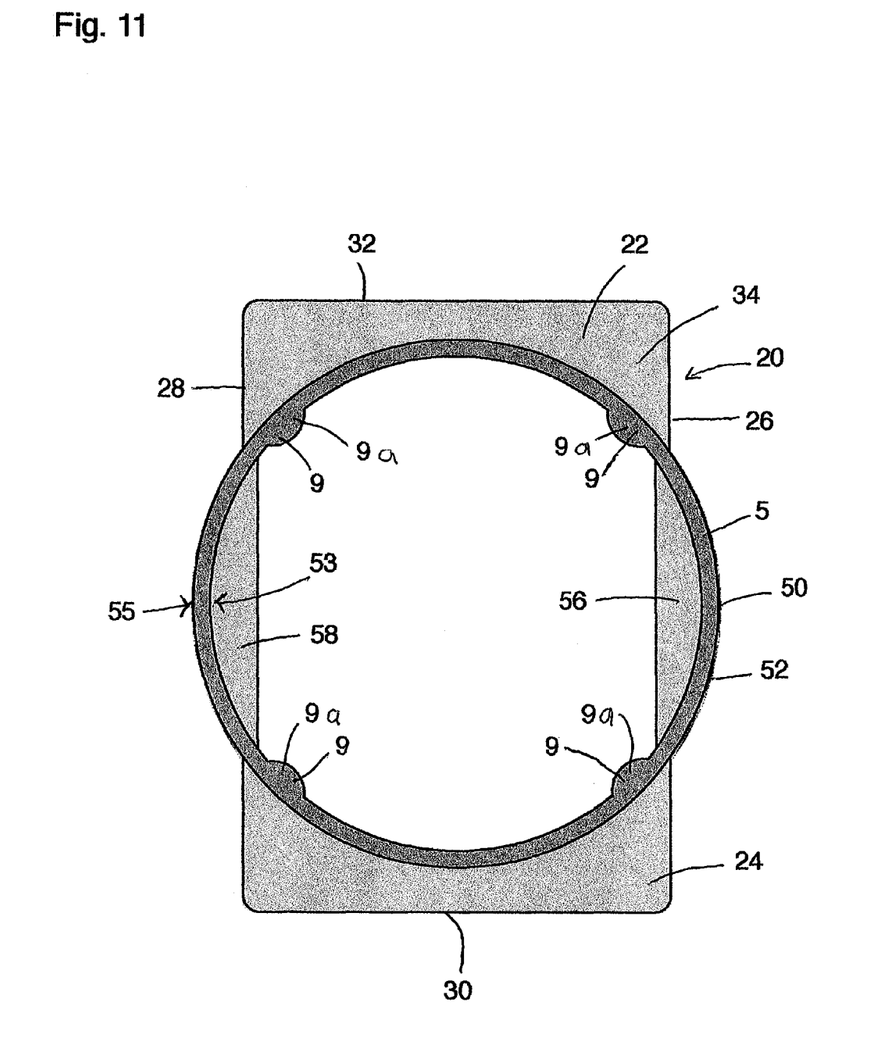
FIG. 11 is a bottom view of the lighting housing.

As shown in FIG. 11, extending from the first circular shaped housing edge 52 and from the interior circular shaped housing wall surface 53 are tabs 9. In one of the preferred embodiments there are four tabs 9, but there can be more in other preferred embodiments. As shown in FIGS. 8 and 11 the tabs 9 have opposed first and second tab surfaces 9a, 9b and the first tab surface 9a is co-planar with the first circular shaped housing edges 52, such that the first tab surface 9a is flush with the first circular shaped housing edge 52.

Figure 12:
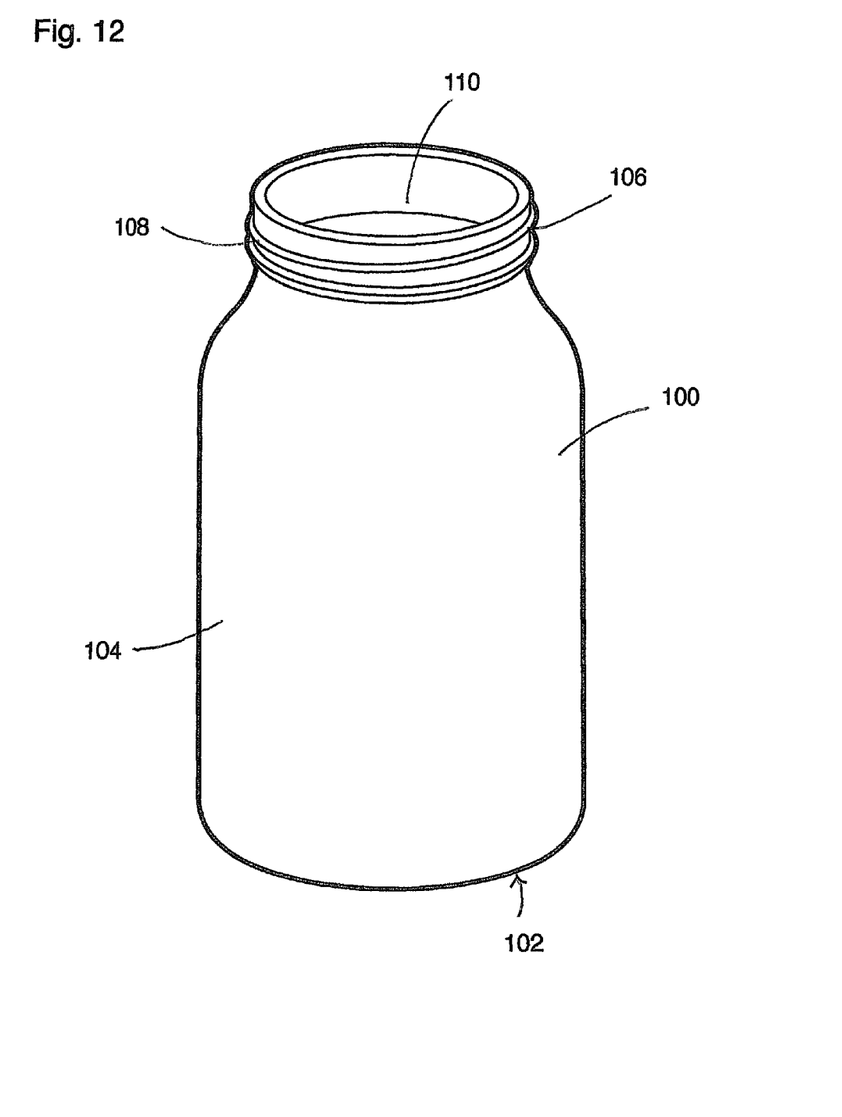
FIG. 12 is a front view of a threaded container.
Figure 13:
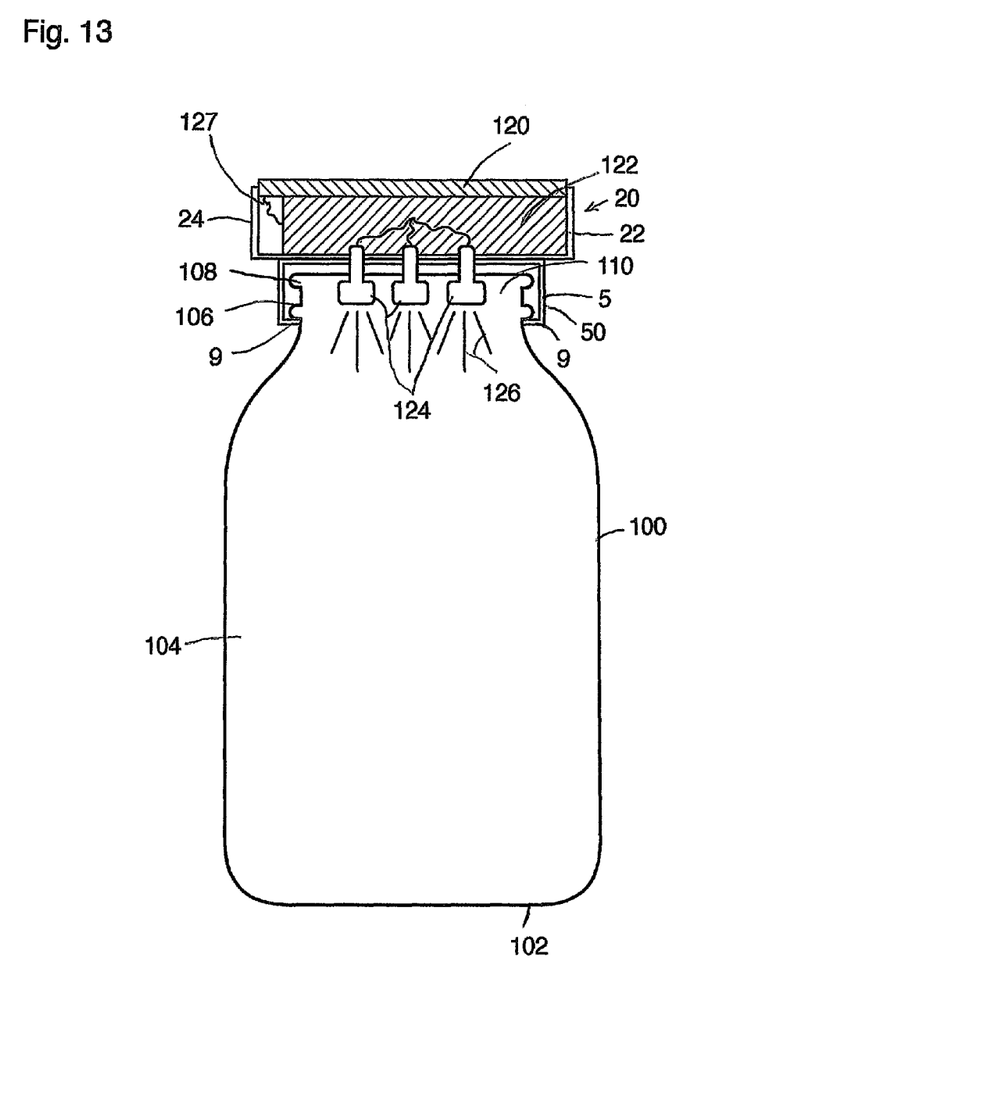
FIG. 13 is a sectional view of a lighting assembly showing the threaded container joined to threaded container.

As shown in FIG. 12, the threaded container 100 is embodied as a jar is made of glass, plastic, colored or tinted glass and plastics, translucent materials, and other suitable materials through which light can be transmitted. The threaded container 100 can be in the form of a canning jar, food product jar, or virtually any jar or container having an external thread. The threaded container 100 has a container base 102, a surrounding container wall 104 that is joined to the container base 102, and an externally threaded portion 106 that extends from the surrounding container wall 104. The externally threaded portion 106 has an external thread 108 and defines a container opening 110. As best shown in FIG. 13, the externally threaded portion 106 is adapted to interlock with the tabs 9 such that the tabs 9 securely hold the threaded container 100 to circular shaped housing wall 50, or the tabs 9 are threaded to the externally threaded portion 106 of the threaded container. FIG. 13 also shows a solar panel 120, a battery 122 for collecting solar energy captured by the solar panel 120 and LEDs 124 powered by the battery 122 and emitting light 126. The solar panel 120 is disposed on the battery 122, which itself is disposed in the rectangular box-shaped portion 24 of the lighting housing 22 and wiring 127 connects the battery 122 and the solar panel 120.

Figure 14:
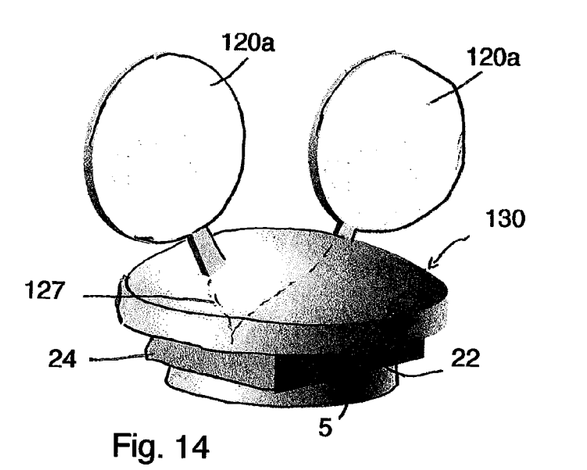
FIG. 14 is another embodiment for a solar panel.
Figure 15:
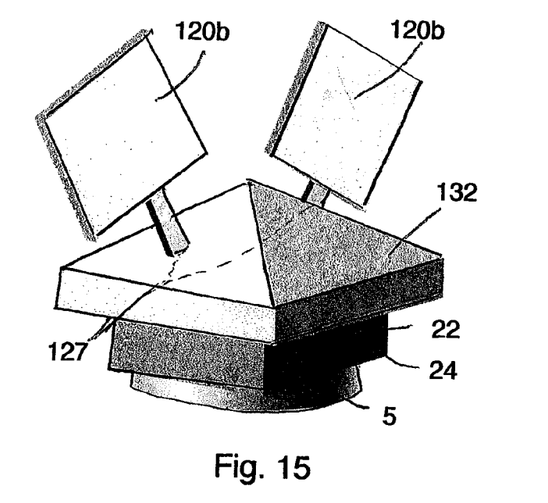
FIG. 15 is another embodiment for a solar panel.
Figure 16:
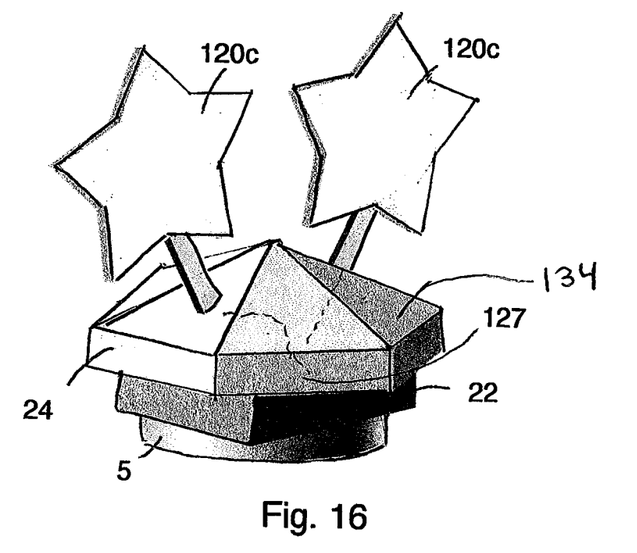
FIG. 16 is another embodiment for a solar panel.

Other preferred embodiments of the solar panel 120 are shown in FIGS. 14-16. In FIG. 14 there is a circular shaped cap 130 with circular shaped solar panels 120a extending there-from, in FIG. 15 there is a four faced pyramid shaped cap 132 with square shaped solar panels 120b extending there-from, and in FIG. 16 there is a six side pyramid shaped cap 134 with star shaped solar panels 120c extending there-from. In each of these embodiments the circular shaped cap 130, the four faced pyramid shaped cap 132 and the six sided pyramid shaped cap 134 are joined to the lighting housing 22 having the rectangular box-shaped portion 24 and circular point of attachment 5. An adhesive may be used to join them together. Wiring 127 extends from the extends from the circular shaped solar panels 120a, square shaped solar panels 120b, and the star shaped solar panels 120c to the battery 122.

It will be appreciated by those skilled in the art that while the solar lid jar and the lighting assembly have been described in detail herein, the invention is not necessarily so limited and other examples, embodiments, uses, modifications, and departures from the embodiments, examples, uses, and modifications may be made without departing from the process and all such embodiments are intended to be within the scope and spirit of the appended claims.

What is claimed is:

1. A lighting assembly (20) comprising:
    a lighting housing (22) having:
        a) a rectangular box-shaped portion (24) having a base wall (34) from which extend opposed first and second housing walls (26), (28) and opposed third and forth housing walls (30), (32) that together define a housing recess (44);
        b) the base wall (34) having opposed first and second convex surfaces (36), (38), and each of these surfaces extends from the first housing wall (26) to the second housing wall (28);
        c) wherein the first and second convex surfaces (36), (38) and first and second housing walls (26), (28) define a base wall opening (40) and the housing recess (44) extends to the base wall opening (40);
        d) a circular point of attachment (5) having a circular shaped housing wall (50) having opposed first and second circular shaped housing edges (52), (54) with opposed interior and exterior circular shaped housing wall surfaces (53), (55) and wherein the second circular shaped housing edge (54) meets with and merges with the base wall (34) of the rectangular shaped portion (24);
    a solar panel (120) and a battery (122), and the solar panel (120) is disposed on the battery (122) and the solar panel (120) and the battery (122) are disposed in the rectangular box-shaped portion (24) and a light emitting diode (124) supported by the battery (122) and wired to and powered by the battery (122) and the light emitting diode (124) for providing light; and,
    a threaded container (100) having a container base (102), a surrounding container wall (104) that is joined to the container base (102), and an externally threaded portion (106) that extends from the surrounding container wall (104) and wherein the externally threaded portion (106) has an external thread (108) and defines a container opening (110) and wherein the externally threaded portion (106) is capable operatively engaging the circular shaped housing wall (50) and wherein the light emitting diode (124) is disposed in the threaded container (100) and for emitting light (126).

2. The lighting assembly (20) according to claim 1 further including a first container stop wall (56) that extends from the second circular shaped housing edge (54) to the first housing wall (26) and a second container stop wall (58) extends from the second circular shaped housing edge (54) to the second housing wall (28).

3. The lighting assembly (20) according to claim 1 further wherein the rectangular box-shaped portion (24) and the circular point of attachment (5) are formed as a one-piece body (34).

4. The lighting assembly (20) according to claim 1 further wherein tabs (9) each having opposed first and second tab sides (9a), (9b) extend from the interior circular shaped housing wall surface (53) and the first tab surfaces (9a) are coplanar with the first circular shaped housing edge (52).

5. The lighting assembly (20) according to claim 4 wherein the tabs (9) are for engagement with the external thread (108) of the threaded container (100) and secure the threaded container (100) and circular point of attachment (5) together.

6. The lighting assembly (20) according to claim 1 wherein the threaded container (100) is made of at least one of the following: glass, plastic, colored glass, colored plastic, and a translucent material.

7. The lighting assembly according to claim 1 wherein the shape of the solar panel (120) is selected from the group comprising rectangular shaped, star shaped, and circular shaped.

8. A lighting housing (22) adapted to be supported by a threaded container (100), the lighting housing (22) comprising:
    a) a rectangular box-shaped portion (24) having a base wall (34) from which extend opposed first and second housing walls (26), (28) and opposed third and forth housing walls (30), (32) that together define a housing recess (44);
    b) the base wall (34) having opposed first and second convex surfaces (36), (38), and each of these surfaces extends from the first housing wall (26) to the second housing wall (28);
    c) wherein the first and second convex surfaces (36), (38) and first and second housing walls (26), (28) define a base wall opening (40) and the housing recess (44) extends to the base wall opening (40); and,
    d) a circular point of attachment (5) having a circular shaped housing wall (50) having opposed first and second circular shaped housing edges (52), (54) with opposed interior and exterior circular shaped housing wall surfaces (53), (55) and wherein the second circular shaped housing edge (54) meets with and merges with the base wall (34) of the rectangular box-shaped portion (24).

9. The lighting housing according to claim 8 wherein the threaded container (100) has a container base (102), a surrounding container wall (104) that is joined to the container base (102), and an externally threaded portion (106) that extends from the surrounding container wall (104) and wherein the externally threaded portion (106) has an external thread (108) and defines a container opening (110) and wherein the externally threaded portion (106) is capable operatively engaging the circular shaped housing wall (50).

10. The lighting housing according to claim 8 further including a first container stop wall (56) that extends from the second circular shaped housing edge (54) to the first housing wall (26) and a second container stop wall (58) extends from the second circular shaped housing edge (54) to the second housing wall (28).

11. The lighting housing according to claim 8 further wherein the rectangular box-shaped portion (24) and the circular point of attachment (5) are formed as a one-piece body (34).

12. The lighting housing according to claim 9 further wherein tabs (9) each having opposed first and second tab sides (9a), (9b) extend from the interior circular shaped housing wall surface (53) and the first tab surfaces (9a) are coplanar with the first circular shaped housing edge (52) and the tabs (9) are for engagement with the external thread (108) of the threaded container (100) and secure the threaded container (100) and circular point of attachment (5) together.

\* \* \* \* \*